No. 682,902. Patented Sept. 17, 1901.
J. BEAN.
SPRAYING PUMP.
(Application filed May 31, 1901.)
(No Model.)
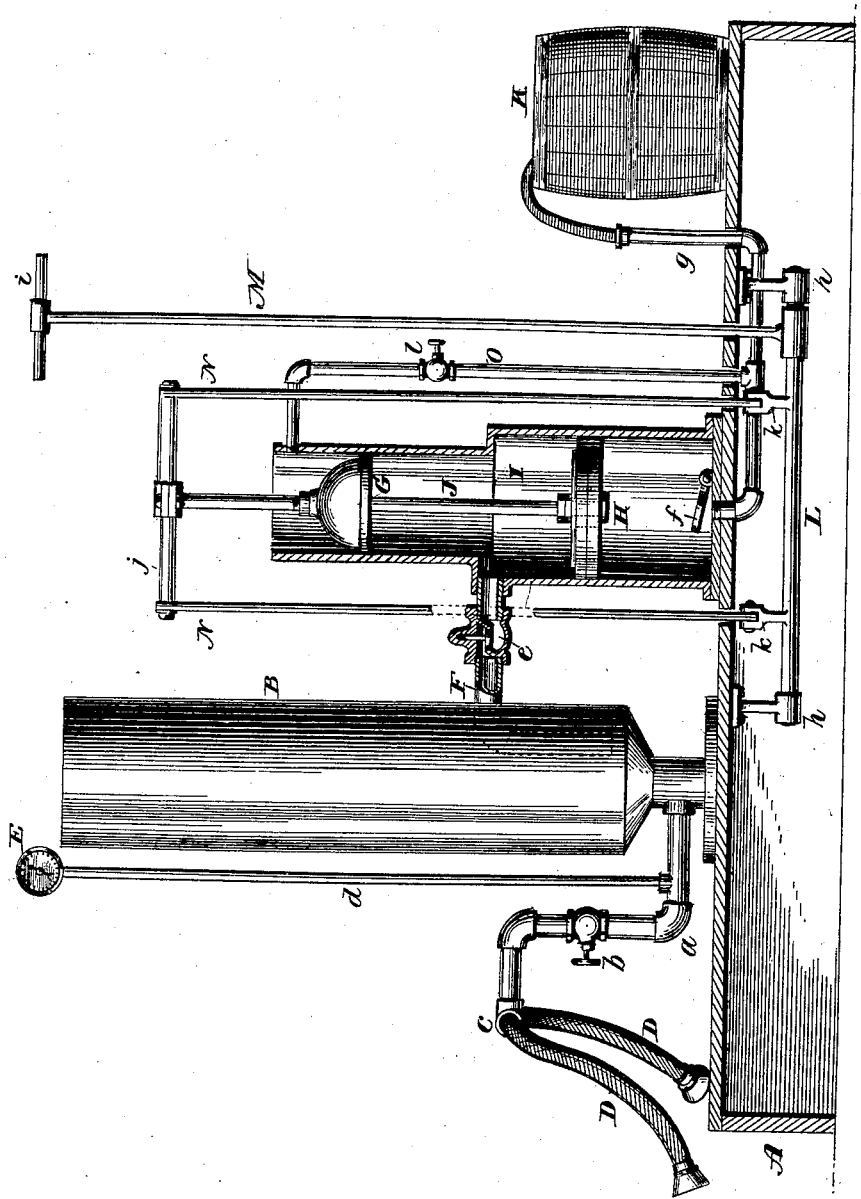
Witnesses
C. J. Williamson
B. F. Lowe
Inventor
John Bean.
per Chas. H. Fowler
Attorney

UNITED STATES PATENT OFFICE.

JOHN BEAN, OF LOS GATOS, CALIFORNIA.

SPRAYING-PUMP.

SPECIFICATION forming part of Letters Patent No. 682,902, dated September 17, 1901.

Application filed May 31, 1901. Serial No. 62,533. (No model.)

*To all whom it may concern:*

Be it known that I, JOHN BEAN, a citizen of the United States, residing at Los Gatos, in the county of Santa Clara and State of California, have invented certain new and useful Improvements in Spraying-Pumps; and I do hereby declare that the following is a full, clear, and exact description of the same, reference being had to the annexed drawings, making a part of this specification, and to the letters of reference marked thereon.

The present invention has for its object to provide a spraying-pump that will possess strength and durability, is simple in construction, and easy of operation.

The invention consists in a spraying-pump constructed substantially as shown in the drawing and hereinafter described and claimed.

In the accompanying drawing, which represents a sectional view, partly in elevation, of a spraying-pump embodying my invention, A designates a suitable platform or support, to which are connected the several parts comprising the pump and which also serves as a floor upon which the operator stands. An upright tank B of any suitable form and construction is connected to the platform or support A and is provided with a discharge-pipe a of any preferred construction, which communicates with the tank at or near the bottom thereof. This pipe a is provided with a valve b and a suitable branch coupling c, to which the sprinkling or spraying hose are connected, as shown at D, the discharge-pipe, hose, and their connections being of any desirable construction found best adapted to the purpose. Communicating with the discharge-pipe a is an upright pipe d, having upon its upper end a suitable pressure-gage E, whereby the pressure in the tank B may be ascertained, said tank containing the air and the spraying liquid.

A pipe F communicates with the interior of the tank B and extends down to near the bottom thereof, as shown in dotted lines, the horizontal portion of said pipe having a check-valve e to prevent the pressure from the tank interfering with the plunger-heads G H when at rest. The horizontal portion of the pipe F communicates with the interior of the pump-cylinder I at or near the middle thereof to convey the water from the cylinder to the tank. The upper portion of the pump-cylinder I is of less diameter than the lower portion and has working therein the plunger-heads G H, which are connected to the plunger-rod J. The plunger-head G is solid or without any valve therein, while the plunger-head H is provided with the usual valve, the form and construction of the plunger-head being immaterial, and any suitable plunger-heads may be substituted for those herein shown.

The lower end of the pump-cylinder I is provided with a suitable check-valve f, which opens upward to admit the fluid or spraying liquid to the cylinder through the suction-pipe g. This suction-pipe g may be provided with a suitable hose to more conveniently enter a barrel or other suitable receptacle K, from which the spraying fluid or liquid is supplied through the pipe g to the pump-cylinder.

To the under side of the platform or support A are connected suitable brackets h to form bearings for the rocking shaft L, which shaft is operated by a swinging lever M, provided with a suitable handle i at its upper end.

The plunger-rod J has suitably connected at its upper end a cross-bar j, and to the extremities of this cross-bar are connected pitman-rods N, said rods being pivotally connected with the rocking shaft L through the medium of the ears or lugs k.

An upright pipe O forms a communication with the suction-pipe g and with the interior of the pump-cylinder I at a point above the plunger-head G for drawing off any water accumulating above the plunger-head and also supplying air to the pump-cylinder. Through the pipe O the pump-cylinder below the plunger-head H may be supplied with the necessary amount of air to supercharge the same for the successful operation of the pump, said pipe having a suitable valve l to open or close the supply as required.

After the suction pipe or hose is inserted in the barrel or receptacle K, which is supplied with the fluid or spraying liquid, the lever M is swung back and forth and through its connection with the plunger-rod J, as hereinbefore described, the plunger-heads will be operated to prime the pump-cylinder. After this is accomplished the valve $l$ in pipe O is opened for the purpose of drawing in air at a point above the plunger-head G, which air will pass down the pipe and into the pump-cylinder at the lower end thereof, said air in combination with the fluid or spraying liquid passing into the cylinder. This process of supplying air and liquid to the lower end of the cylinder is continued until the pressure-gage E will indicate the desired number of pounds pressure, after which the valve $l$ is closed and the pumping continued. After the valve $l$ is closed the supply of air is shut off and only the fluid or spraying liquid is pumped through the suction-pipe $g$, said pumping being continued until the required pressure is shown on the pressure-gage, after which the valve $b$ in the discharge-pipe $h$ is opened, allowing the fluid or spraying liquid which has been supplied to the tank B through pipe F to pass into the hose D for spraying.

It is immaterial what kind of a rose-head or nozzle is provided for the discharge of the fluid or spraying liquid, and any suitable connection may be made with the tank for the discharge of the fluid or liquid.

The suction-pipe, which communicates with the source of supply, may be a metal pipe or rubber or other flexible hose, as found most desirable, and the plunger-heads may be of any well-known form or construction best adapted to the purpose.

Without departing from the spirit of my invention there may be many modifications or changes in the details of construction, and any such changes that would come within ordinary mechanical skill and judgment may be resorted to without in any manner affecting the essential features of the invention.

Having now fully described my invention, what I claim as new, and desire to secure by Letters Patent, is—

1. A spraying-pump consisting of a suitable tank for the air and spraying fluid or liquid, means for connecting a hose thereto, a pump-cylinder connecting with the tank, a check-valve controlling the passage between the tank and cylinder, suitable plunger-heads adapted to work in the cylinder, a suction pipe or hose communicating with the pump-cylinder at the bottom thereof, and a pipe with valve communicating with the suction pipe or hose and with the pump-cylinder at the top thereof, substantially as and for the purpose set forth.

2. In a spraying-pump, a suitable tank for the spraying liquid and means for discharging the same, a suitable pump-cylinder communicating with the tank, a check-valve for controlling the communication between the tank and cylinder, a suction pipe or hose communicating with the lower end of the pump-cylinder, a valve for controlling the communication between the cylinder and the suction pipe or hose, a pipe with valve communicating with the suction pipe or hose and with the pump-cylinder at the upper end thereof, and suitable plunger-heads adapted to work in the cylinder, and means for operating said head through the medium of a rocking shaft, substantially as and for the purpose specified.

3. In a spraying-pump, a suitable pump-cylinder, a suction-pipe communicating therewith, a pipe with valve communicating with the suction-pipe and with the pump-cylinder at the upper end thereof, a plunger-rod with plunger head or heads adapted to work in the cylinder, and means for operating the plunger-rod, comprising a horizontal rocking shaft located below the lower end of the cylinder and having its bearings in stationary brackets, suitable lugs upon the shaft, pitman-rods pivoted thereto to form crank connections between the rocking shaft and pitman-rods, a cross-bar connecting with the plunger-rod at the upper end thereof and the pitman-rods pivotally connecting with the ends of the cross-bar, and an upright operating-lever connected to one end of the rocking shaft, substantially as and for the purpose described.

In testimony that I claim the above I have hereunto subscribed my name in the presence of two witnesses.

JOHN BEAN.

Witnesses:
WESLEY PECK,
DAVID C. CRUMWAY.